United States Patent
Park

(10) Patent No.: US 11,188,485 B2
(45) Date of Patent: Nov. 30, 2021

(54) MEMORY SYSTEM AND OPERATING METHOD THEREOF

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 285 days.

(21) Appl. No.: 16/036,543

(22) Filed: Jul. 16, 2018

(65) Prior Publication Data

US 2019/0179781 A1    Jun. 13, 2019

(30) Foreign Application Priority Data

Dec. 12, 2017 (KR) .................. 10-2017-0170593

(51) Int. Cl.
| | |
|---|---|
| *G06F 12/00* | (2006.01) |
| *G06F 12/02* | (2006.01) |
| *G06F 13/00* | (2006.01) |
| *G06F 13/10* | (2006.01) |
| *G06F 13/16* | (2006.01) |
| *G06F 12/06* | (2006.01) |

(52) U.S. Cl.
CPC .......... *G06F 13/1694* (2013.01); *G06F 12/00* (2013.01); *G06F 12/0246* (2013.01); *G06F 13/00* (2013.01); *G06F 13/10* (2013.01); *G06F 13/1668* (2013.01); *G06F 12/0646* (2013.01)

(58) Field of Classification Search
None
See application file for complete search history.

(56) References Cited

U.S. PATENT DOCUMENTS

| | | | | |
|---|---|---|---|---|
| 7,721,011 | B1 * | 5/2010 | Sutera ................... | G06F 1/3225 710/6 |
| 8,321,597 | B2 * | 11/2012 | Yu ........................ | G06F 12/0246 710/5 |
| 9,195,590 | B2 * | 11/2015 | Fontana .................. | G06F 3/064 |
| 10,528,465 | B2 * | 1/2020 | Park ..................... | G06F 3/0679 |
| 10,871,919 | B2 * | 12/2020 | Hong .................... | G06F 3/0644 |
| 2009/0089485 | A1 * | 4/2009 | Yeh ...................... | G06F 12/0246 711/103 |
| 2009/0287875 | A1 * | 11/2009 | Lin ...................... | G06F 12/0246 711/103 |
| 2014/0013063 | A1 * | 1/2014 | Yan ...................... | G06F 13/1694 711/154 |
| 2014/0281149 | A1 * | 9/2014 | Roberts ................. | G06F 12/023 711/103 |
| 2017/0277588 | A1 * | 9/2017 | Kim ...................... | G11C 7/1006 |
| 2017/0344278 | A1 * | 11/2017 | Hong .................... | G11C 16/349 |
| 2019/0179548 | A1 * | 6/2019 | Lee ....................... | G06F 3/061 |
| 2019/0179781 | A1 * | 6/2019 | Park ..................... | G06F 12/0246 |

FOREIGN PATENT DOCUMENTS

KR    1020150097001    8/2015

* cited by examiner

*Primary Examiner* — Tanh Q Nguyen
(74) *Attorney, Agent, or Firm* — IP & T Group LLP

(57) ABSTRACT

A memory system includes a first memory comprising at least one first code region; a second memory comprising at least one second code region; and a control unit configured to perform a first operation by executing a first code loaded to the first code region, and perform a second operation by executing a second code loaded to the second code region. The control unit performs a swap operation on the first code and the second code, based on a swap condition.

3 Claims, 9 Drawing Sheets

MEMORY SYSTEM AND OPERATING METHOD THEREOF

CROSS-REFERENCES TO RELATED APPLICATION

The present application claims priority under 35 U.S.C. § 119(a) to Korean application number 10-2017-0170593, filed on Dec. 12, 2017, which is incorporated herein by reference in its entirety.

BACKGROUND

1. Technical Field

Various embodiments generally relate to a memory system, and more particularly, to a memory system including a nonvolatile memory device.

2. Related Art

Memory systems store data provided by an external device in response to a write request. Memory systems may also provide stored data to an external device in response to a read request. Examples of external devices that use memory systems include computers, digital cameras, cellular phones and the like. Memory systems may be embedded in an external device during manufacturing of the external devices or may be fabricated separately and then connected afterwards to an external device.

SUMMARY

In an embodiment, a memory system may include: a first memory comprising at least one first code region; a second memory comprising at least one second code region, and a control unit configured to perform a first operation by executing a first code loaded to the first code region, and perform a second operation by executing a second code loaded to the second code region. The control unit may perform a swap operation on the first code and the second code, based on a swap condition.

In an embodiment, an operating method of a memory system may include: checking call frequencies of codes loaded to one or more code regions of a first memory, and codes loaded to one or more code regions of a second memory; selecting a first code loaded to a first code region of the first memory and a second code loaded to a second code region of the second memory, based on the call frequencies; and performing a swap operation in order to load the second code to the first code region, and to load the first code to the second code region.

In an embodiment, a memory system may include: a first memory comprising a first code region; a second memory comprising a second code region; and a control unit configured to count sleep calls of a sleep code loaded to the first code region and garbage collection (GC) calls of a GC code loaded to the second code region, and perform a swap operation on the sleep code and the GC code based on sleep call count and the GC call count.

In an embodiment, a memory system may include: a memory device storing a plurality of operation codes; first and second memories having different operation speeds; and a controller suitable for: controlling the memory device to perform an operation by loading one or more among the operation codes onto one or more of the first and second memories and executing the loaded operation codes; and swapping a pair of the operation codes respectively loaded onto the first and second memories according to loading frequencies of the respective loaded operation codes onto the first and second memories.

DETAILED DESCRIPTION

Figure 1:
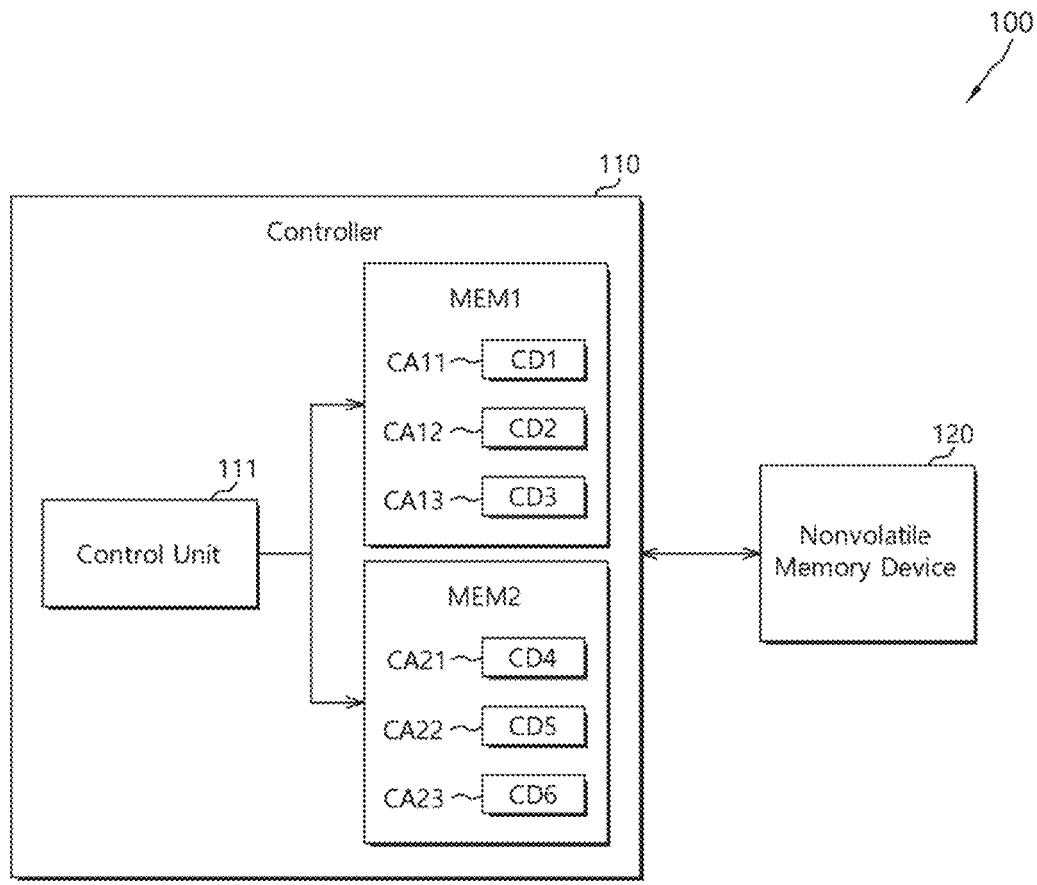
FIG. 1 is a block diagram illustrating a memory system in accordance with an embodiment.

Hereinafter, a memory system and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a memory system 100 in accordance with an embodiment.

The memory system 100 may be configured to store data provided from an external host device, in response to a write request of the host device. Furthermore, the memory system 100 may be configured to provide data stored therein to the host device, in response to a read request of the host device.

The memory system 100 may be prepared in the form of a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

The memory system 100 may include a controller 110 and a nonvolatile memory device 120.

The controller 110 may control overall operations of the memory system 100. The controller 110 may access the nonvolatile memory device 120 in order to process a request of the host device. Furthermore, the controller 110 may access the nonvolatile memory device 120 in order to perform an internal management operation or background operation of the memory system 100, regardless of a request of the host device. The access to the nonvolatile memory device 120 by the controller 110 may include a write access and read access.

The controller 110 may include a control unit 111 and first and second memories MEM1 and MEM2.

The control unit 111 may select or call one or more of codes CD1 to CD3 loaded to the first memory MEM1 and codes CD4 to CD6 loaded to the second memory MEM2, and perform an operation related to the called code by executing the called code. Each of the codes CD1 to CD6 may include a group of execution commands for performing an operation for a predetermined purpose. For example, the codes CD1 to CD6 may include a code for write/read-accessing the nonvolatile memory device 120, a code for performing a wear-leveling operation on the nonvolatile memory device 120, a code for performing a garbage collection operation on the nonvolatile memory device 120, a code for power management of the memory system 100, and a code for encoding data to store in the nonvolatile memory device 120 or decoding data read from the nonvolatile memory device 120.

Although not illustrated, the codes CD1 to CD6 and various other codes may be stored in the nonvolatile memory device 120. The control unit 111 may load the codes CD1 to CD6 from the nonvolatile memory device 120 to the first and second memories MEM1 and MEM2, during booting or if necessary during operation.

The first and second memories MEM1 and MEM2 may be volatile memories. The first memory MEM1 may have a higher operation speed than the second memory MEM2. The first memory MEM1 may be coupled to the control unit 111 so as to communicate with the control unit 111 faster than the second memory MEM2. Thus, the first memory MEM1 can be accessed more quickly than the second memory MEM2 by the control unit 111. The first memory MEM1 may be directly coupled to the control unit 111 so as to be accessed more quickly than the second memory MEM2 by the control unit 111, and the second memory MEM2 may be indirectly coupled to the control unit 111 through another relay unit (not illustrated).

In short, the structures of the first and second memories MEM1 and MEM2 and/or the connection relations between the first and second memories MEM1 and MEM2 and the control unit 111 may be different from each other. As a result, the control unit 111 may access the first memory MEM1 more quickly than the second memory MEM2.

In the present embodiment, the first memory MEM1 may include code regions CA11 to CA13, and the second memory MEM2 may include code regions CA21 to CA23. The code regions CA11 to CA13 and C21 to CA23 may have the same size. The code regions CA11 to CA13 and CA21 to CA23 may have the same structure. For example, each of the code regions CA11 to CA13 and CA21 to CA23 may include a header region at the same location for storing code information. Although described later, the codes CD1 to CD6 of the code regions CA11 to CA13 and CA21 to CA23 can be swapped between the first and second memories MEM1 and MEM2. The number of code regions included in each of the first and second memories MEM1 and MEM2 is not limited to "3" as illustrated in FIG. 1.

The code regions CA11 to CA13 of the first memory MEM1 may store the codes CD1 to CD3, respectively. The codes may be stored in the nonvolatile memory device 120, for example, and loaded to the first memory MEM1, during booting or if necessary.

Similarly, the code regions CA21 to CA23 of the second memory MEM2 may store the codes CD4 to CD6, respectively. The codes CD4 to CD6 may be stored in the nonvolatile memory device 120, for example, and loaded to the second memory MEM2, during booting or if necessary.

It may be predetermined which codes are to be loaded into the first and second memories MEM1 and MEM2, respectively, during booting. For example, a code which is to be more frequently used during booting may be loaded to the first memory MEM1 having higher speed, and a code which is to be less frequently used during booting may be loaded to the second memory MEM2 having lower speed.

While the memory system 100 is operated, the call frequencies of the codes CD1 to CD6 may be changed depending on a situation. The call frequency of a certain code may be proportional to a number of times the corresponding code is called for a predetermined time. For example, the call frequency of the code CD4 may be low during booting, but may increase with time. When a code with a high call frequency continuously stays in the second memory MEM2, the operation performance of the control unit 111 may be degraded. When the codes CD1 to CD6 are rearranged between the first and second memories MEM1 and MEM2 depending on the call frequencies while the memory system 100 is operated, the operation performance of the control unit 111 can be improved.

The control unit 111 in accordance with the present embodiment may monitor the call frequencies of all or part of the codes CD1 to CD6. The control unit 11 may perform a swap operation on two codes respectively selected from the first and second memories MEM1 and MEM2 based on the monitored call frequencies.

Figure 2:
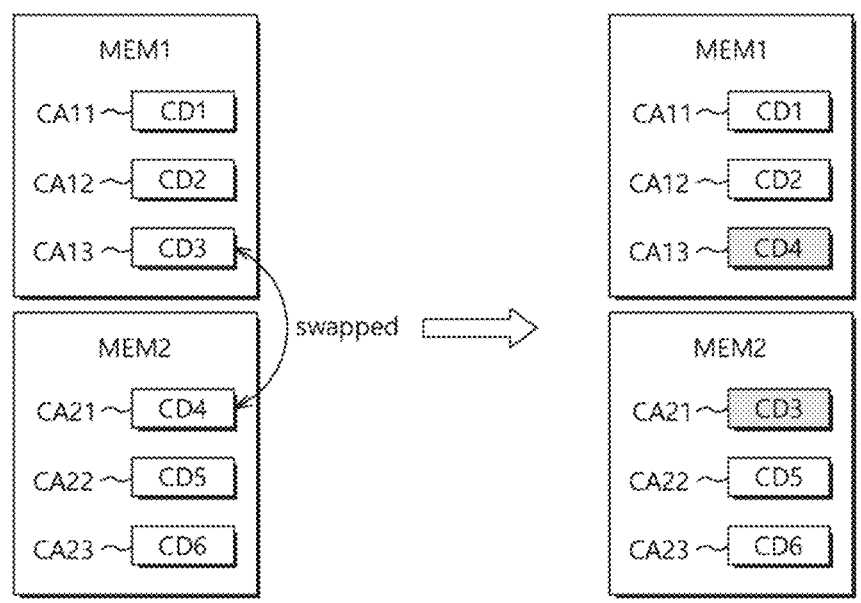
FIG. 2 is a diagram illustrating a result of a swap operation which is performed on codes by a control unit shown in FIG. 1.

FIG. 2 illustrates results obtained by performing a swap operation on the codes CD3 and CD4 through the control unit 111 of FIG. 1. Referring to FIG. 2, the swap operation may be performed in such a manner that each of the codes CD3 and CD4 is stored in a code region of another memory, instead of the memory in which the code is currently stored. The control unit 111 may store the code CD3 stored in the code region CA13 of the first memory MEM1 and the code CD4 stored in the code region CA21 of the second memory MEM2 into the counterpart code regions, respectively.

In another embodiment, the control unit 111 may perform a swap operation on a predetermined pair of codes. In other words, the control unit 111 may compare the call frequencies of paired codes, instead of arbitrary codes, and perform a swap operation on the pair of codes. For example, the codes CD3 and CD4 which are swapped in FIG. 2 may correspond to the predetermined pair.

The paired codes may be decided in advance. For example, paired codes may be decided when the memory system 100 is designed, and information on the pair may be stored in a predetermined location of the memory system 100 in order to be referred to by the control unit 111. At this time, one or more pairs may be stored.

The paired codes may be codes of opposing operations to each other. For example, the call frequency of one of the paired codes increases/decreases while the call frequency of the other one of the paired codes decreases/increases.

For example, a GC code related to a garbage collection (GC) operation performed during a background operation and a sleep code executed when the memory system 100 enters a sleep mode may be the ones of opposing operations to each other. Therefore, the GC code and the sleep code may be the paired codes.

The control unit 111 may perform a swap operation on the paired codes based on the call frequencies of the paired codes, when the paired codes are loaded to the first and second memories MEM1 and MEM2, respectively. In other words, when two codes loaded to the first and second memories MEM1 and MEM2 are the paired codes, the control unit 111 may swap the paired codes based on the call frequencies of the paired codes.

On the other hand, when all of the paired codes are not loaded to any one of the first and second memories MEM1 and MEM2, the control unit 111 may not perform a swap operation on the paired codes. For example, when any one or both of the paired codes is not or are not loaded to the first or second memory MEM1 or MEM2, the control unit 111 may not swap the paired codes. The method in which the control unit 111 performs a swap operation will be described in detail.

Referring back to FIG. 1, the nonvolatile memory device 120 may store data transmitted from the controller 110, or read data stored therein and transmit the read data to the controller 110, according to control of the controller 110.

The nonvolatile memory device 120 may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

FIG. 1 illustrates that the data storage device includes one nonvolatile memory device 120, but the number of memory devices included in the data storage device is not limited thereto.

Figure 3:
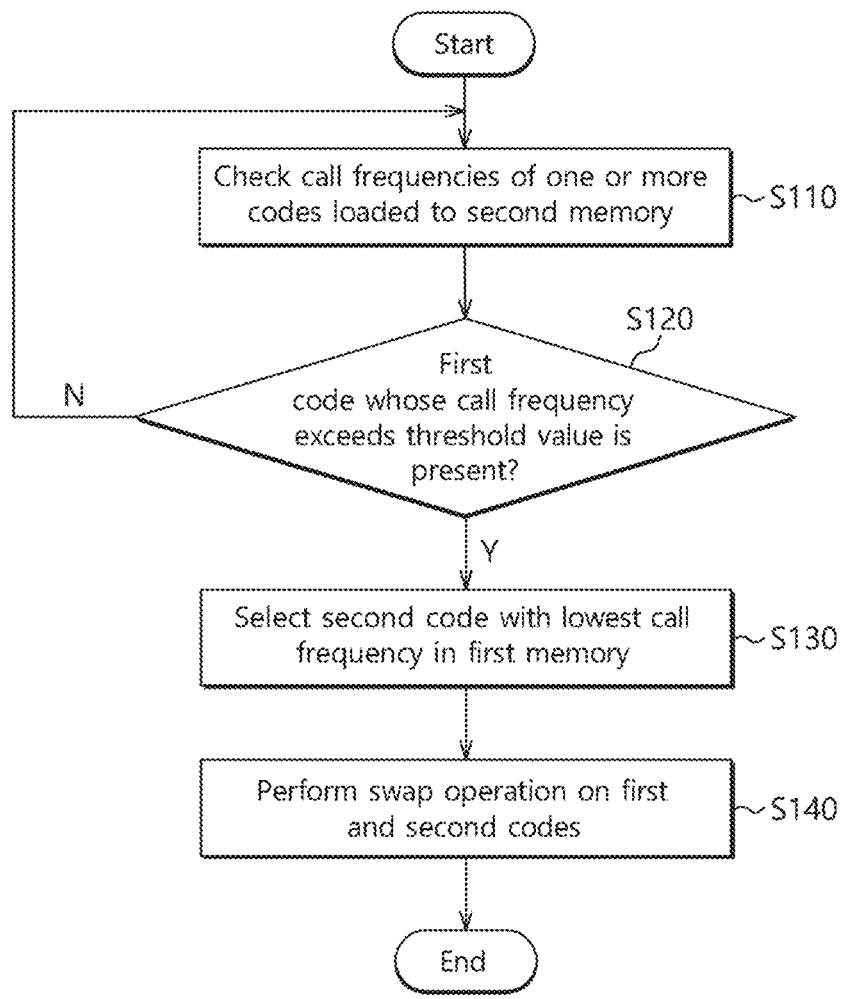
FIG. 3 is a flowchart illustrating a method in which the control unit of FIG. 1 performs a swap operation on codes of first and second memories.

FIG. 3 is a flowchart illustrating a method in which the control unit 111 of FIG. 1 performs a swap operation on the codes of the first and second memories MEM1 and MEM2.

Referring to FIG. 3, the control unit 111 may check the call frequencies of one or more codes loaded to the second memory MEM2 at step S110.

At step S120, the control unit 111 may determine whether there is a first code whose call frequency exceeds a threshold value. When the first code whose call frequency exceeds the threshold value is not present ("N" at step S120), the procedure may proceed to step S110. When the first code whose call frequency exceeds the threshold value is present ("Y" at step S120), the procedure may proceed to step S130.

At step S130, the control unit 111 may check the call frequencies of the codes loaded to the first memory MEM1, and select a second code with the lowest call frequency in the first memory MEM1.

At step S140, the control unit 111 may perform a swap operation on the first code of the second memory MEM2 and the second code of the first memory MEM1.

Figure 4:
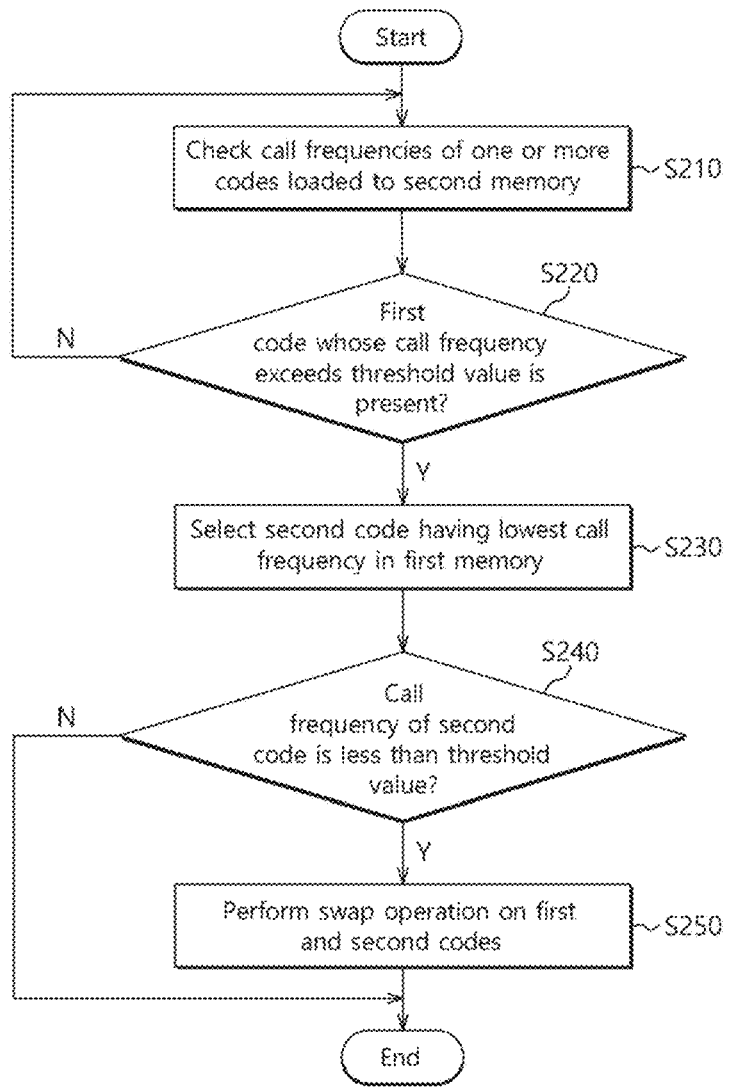
FIG. 4 is a flowchart illustrating another method in which the control unit of FIG. 1 performs a swap operation on codes of the first and second memories.

FIG. 4 is a flowchart illustrating another method in which the control unit 111 of FIG. 1 performs a swap operation on codes of the first and second memories MEM1 and MEM2. According to the procedure illustrated in FIG. 4, the control unit 111 may not perform a swap operation depending on the call frequencies of the codes of the first memory MEM1, even though the call frequency of the code of the second memory MEM2 increases.

Referring to FIG. 4, the control unit 111 may check the call frequencies of one or more codes loaded to the second memory MEM2 at step S210.

At step S220, the control unit 111 may determine whether there is a first code whose call frequency exceeds a first threshold value. When the first code whose call frequency exceeds the first threshold value is not present ("N" at step S220), the procedure may proceed to step S210. When the first code whose call frequency exceeds the first threshold value is present ("Y" at step S220), the procedure may proceed to step S230.

At step S230, the control unit 111 may check the call frequencies of the codes loaded to the first memory MEM1, and select a second code with the lowest call frequency in the first memory MEM1.

At step S240, the control unit 111 may determine whether the call frequency of the second code is less than a second threshold value. When the call frequency of the second code is not less than the second threshold value ("N" at step S240), the procedure may be ended. That is, the control unit 111 may not perform a swap operation when the call frequencies of the codes loaded to the first memory MEM1 are high to some extent. The second threshold value of step S240 may be equal to or different from the first threshold value of step S220.

On the other hand, when the call frequency of the second code is less than the second threshold value ("Y" at step S240), the procedure may proceed to step S250.

At step S250, the control unit 111 may perform a swap operation on the first code of the second memory MEM2 and the second code of the first memory MEM1.

Figure 5:
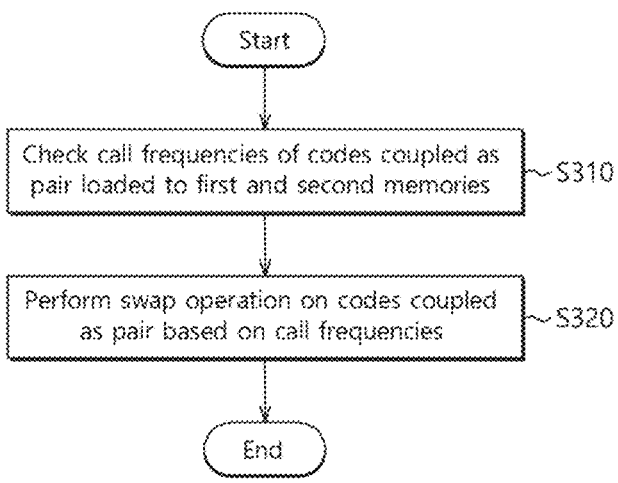
FIG. 5 is a flowchart illustrating another method in which the control unit of FIG. 1 performs a swap operation on codes of the first and second memories.

FIG. 5 is a flowchart illustrating another method in which the control unit 111 of FIG. 1 performs a swap operation on codes of the first and second memories MEM1 and MEM2.

Referring to FIG. 5, the control unit 111 may check the call frequencies of paired codes, which are loaded to the first and second memories MEM1 and MEM2, respectively, at step S310. For example, suppose that a sleep code is loaded to the first memory MEM1 and a GC code is loaded to the second memory MEM2. In this case, the control unit 111 may check the call frequency of the sleep code (hereafter, referred to as a sleep call frequency) and the call frequency of the GC code (hereafter, referred to as a GC call frequency). The sleep call frequency may be proportional to a call count of the sleep code for a predetermined time, that is, a sleep call count, and the GC call frequency may be proportional to a call count of the GC code, that is, a GC call count.

At step S320, the control unit 111 may perform a swap operation on the paired codes, based on the call frequencies of the paired codes. For example, suppose that the sleep code is loaded to the first memory MEM1 and the GC code is loaded to the second memory MEM2. In this case, when the GC call frequency exceeds a threshold value, the control unit 111 may perform a swap operation on the GC code and the sleep code. In the same situation, the control unit 111 may perform a swap operation on the GC code and the sleep code, when the GC call frequency exceeds a first threshold value and the sleep call frequency is less than a second threshold value equal to is or different from the first threshold value. In the same situation, the control unit 111 may perform a swap operation on the GC code and the sleep code when a difference between the GC call frequency and the sleep call frequency exceeds a third threshold value.

Hereafter, a method for performing a swap operation on the GC code and the sleep code in accordance with the embodiment will be described in more detail.

Figure 6:
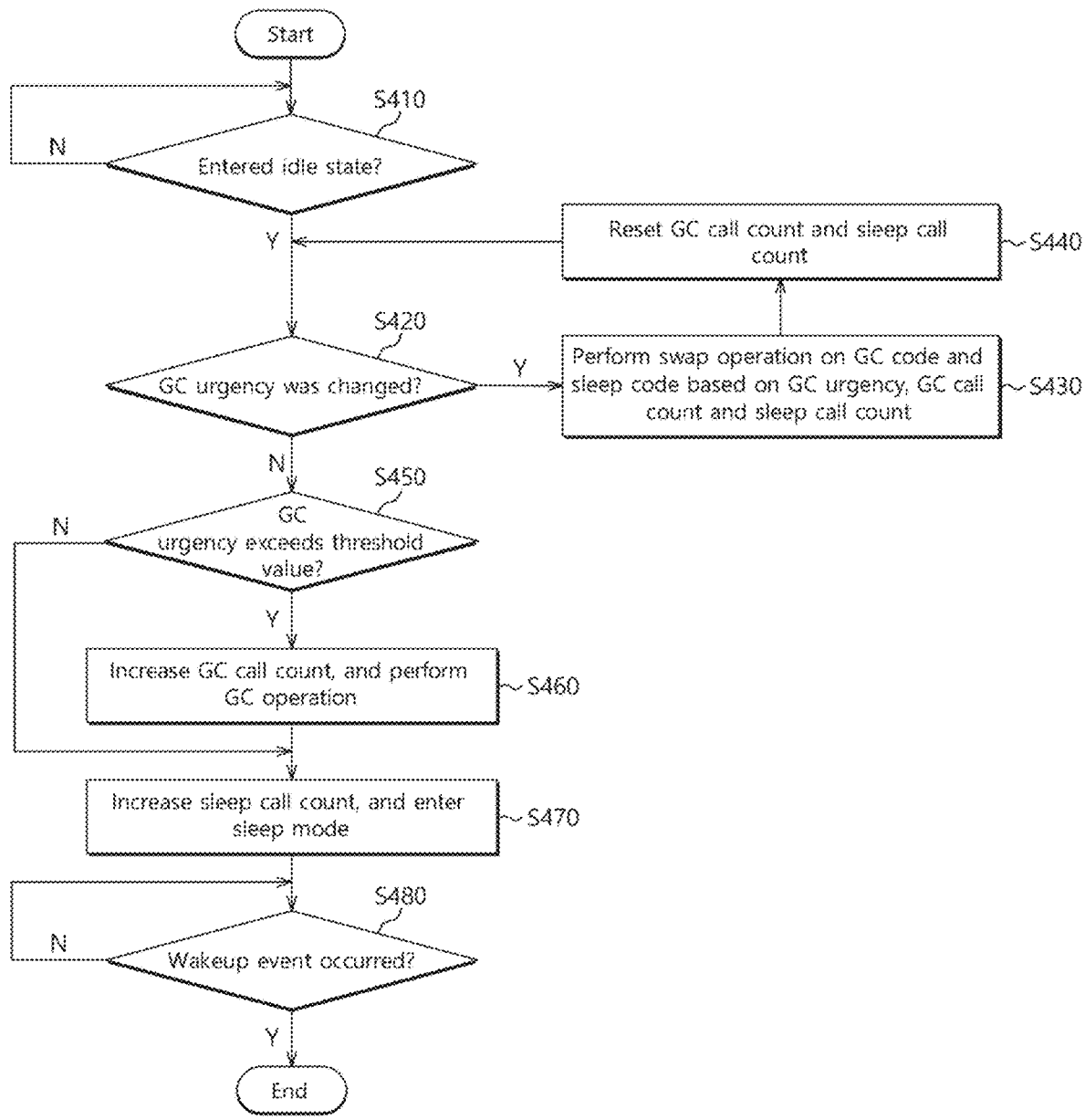
FIG. 6 is a flowchart illustrating a method in which the control unit of FIG. 1 performs a swap operation on a GC code and a sleep code.

FIG. 6 is a flowchart illustrating the method in which the control unit of FIG. 1 performs a swap operation on the GC code and the sleep code.

The control unit 111 may determine GC urgency in connection with a GC operation. The control unit 111 may determine that the GC urgency is high, when the GC operation needs to be urgently performed, for example, when the number of free memory blocks remaining in the nonvolatile memory device 120 is smaller than a reference value. On the other hand, the control unit 111 may determine that the GC urgency is low, when the GC operation does not need to be urgently performed, for example, when the number of free memory blocks remaining in the nonvolatile memory device 120 is larger than the reference value. For example, the GC urgency may be represented by two or more levels.

The control unit 111 may perform a GC operation by calling the GC code depending on the GC urgency in an idle state. The control unit 111 may perform a necessary number of GC operations depending on the GC urgency. After the GC operation is completed, the control unit 111 may call the sleep code to enter the sleep mode. When a wakeup event occurs in the sleep mode, for example, when a request is received from the host device while in the sleep mode, the control unit 111 may escape from the sleep mode.

As described above, the GC code and the sleep code may be paired codes. During booting, the GC code and the sleep code may be loaded to the first and second memories MEM1 and MEM2, respectively, or vice versa. The procedure of FIG. 6 is not limited to the configuration in which the GC code and the sleep code are loaded to specific memories, respectively.

Referring to FIG. 6, the control unit 111 may determine whether the control unit 111 has entered an idle state, at step S410. For example, when a predetermined time has elapsed after the most recent request was received from the host device, the control unit 111 may determine that the control unit 111 has entered the idle state. When it is determined that the control unit 111 did not enter the idle state ("N" at step S410), for example, when the control unit 111 receives a new request before the predetermined time elapses after the most recent request was received, step S410 may be repeated. When it is determined that the control unit 111 has entered the idle state ("Y" at step S410), the procedure may proceed to step S420.

At step S420, the control unit 111 may determine whether the GC urgency was changed. In order to determine whether the GC urgency was changed, the control unit 111 may compare the previously determined GC urgency to the currently determined GC urgency. The previously determined GC urgency may correspond to a level which was determined when the previous GC operation was performed. When the currently determined GC urgency is different from the previously determined GC urgency ("Y" at step S420), the procedure may proceed to step S430.

At step S430, the control unit 111 may selectively perform a swap operation on the GC code and the sleep code, based on the GC urgency, the GC call count and the sleep count. As described above, the control unit 111 may not perform a swap operation depending on a situation, at step S430.

Specifically, when the GC urgency exceeds a predetermined threshold level at step S430, the control unit 111 may swap the GC code and the sleep code such that the GC code is loaded to the first memory MEM1. When the GC code has been already loaded to the first memory MEM1, the control unit 111 may not swap the GC code and the sleep code.

Furthermore, when the GC call count and/or the sleep count satisfy a predetermined swap condition at step S430, the control unit 111 may swap the GC code and the sleep code such that a predetermined code between the GC code and the sleep code is loaded to the first memory MEM1. When the predetermined code between the GC code and the sleep code has been already loaded to the first memory MEM1, the control unit 111 may not swap the GC code and the sleep code.

The predetermined swap condition may indicate that the GC call count exceeds a predetermined threshold value. At this time, the control unit 111 may swap the GC code and the sleep code such that the GC code is loaded to the first memory MEM1.

The predetermined swap condition may indicate that the GC call count exceeds the predetermined threshold value, and the sleep call count is less than a predetermined threshold value. At this time, the control unit 111 may swap the GC code and the sleep code such that the GC code is loaded to the first memory MEM1.

The predetermined swap condition may indicate that the sleep call count exceeds the predetermined threshold value. At this time, the control unit 111 may swap the GC code and the sleep code such that the sleep code is loaded to the first memory MEM1.

The predetermined swap condition may indicate that the sleep call count exceeds the predetermined threshold value and the GC call count is less than the predetermined threshold value. At this time, the control unit 111 may swap the GC code and the sleep code such that the sleep code is loaded to the first memory MEM1.

The predetermined swap condition may indicate that the difference between the GC call count and the sleep call count exceeds a predetermined threshold value. At this time, the control unit 111 may swap the GC code and the sleep code such that the code having a higher call count between the GC code and the sleep code is loaded to the first memory MEM1.

At this time, the predetermined threshold values which are compared to the GC call count and the sleep call count in order to determine whether the predetermined swap condition is satisfied may be equal to or different from one another. The predetermined threshold values may be determined, depending on how often the control unit 11 performs the swap operation.

At step S430, when the GC urgency does not exceed a threshold level, and the GC call count and the sleep call count do not satisfy the predetermined swap condition, the control unit 111 may not perform a swap operation on the GC code and the sleep code.

At step S440, the control unit 111 may reset the GC call count and the sleep call count to a value of "0". The procedure may return to step S420.

When the GC urgency is not changed ("N" at step S420), the procedure may proceed to step S450.

At step S450, the control unit 111 may determine whether the GC urgency exceeds the predetermined threshold value. The threshold value of step S450 may be equal to or different from the threshold value of step S430.

When the GC urgency does not exceed the threshold value ("N" at step S450), the procedure may proceed to step S470. When the GC urgency exceeds the threshold value ("Y" at step S450), the procedure may proceed to step S460.

At step S460, the control unit 111 may increase the GC call count, and call the GC code to perform a GC operation. The control unit 111 may perform a necessary number of GC operations depending on the GC urgency. In another embodiment, the control unit 111 may repeat a predetermined unit of GC operations, and increase the GC call count by 1 or more depending on the number of repeated GC operations.

At step S470, the control unit 111 may increase the sleep call count, and call the sleep code to enter the sleep mode.

At step S480, the control unit 111 may determine whether a wakeup event occurred in the sleep mode. When no wakeup event occurred ("N" at step S480), the step S480 may be repeated. When a wakeup even occurred ("Y" at step S480), the procedure may be ended.

Figure 7:
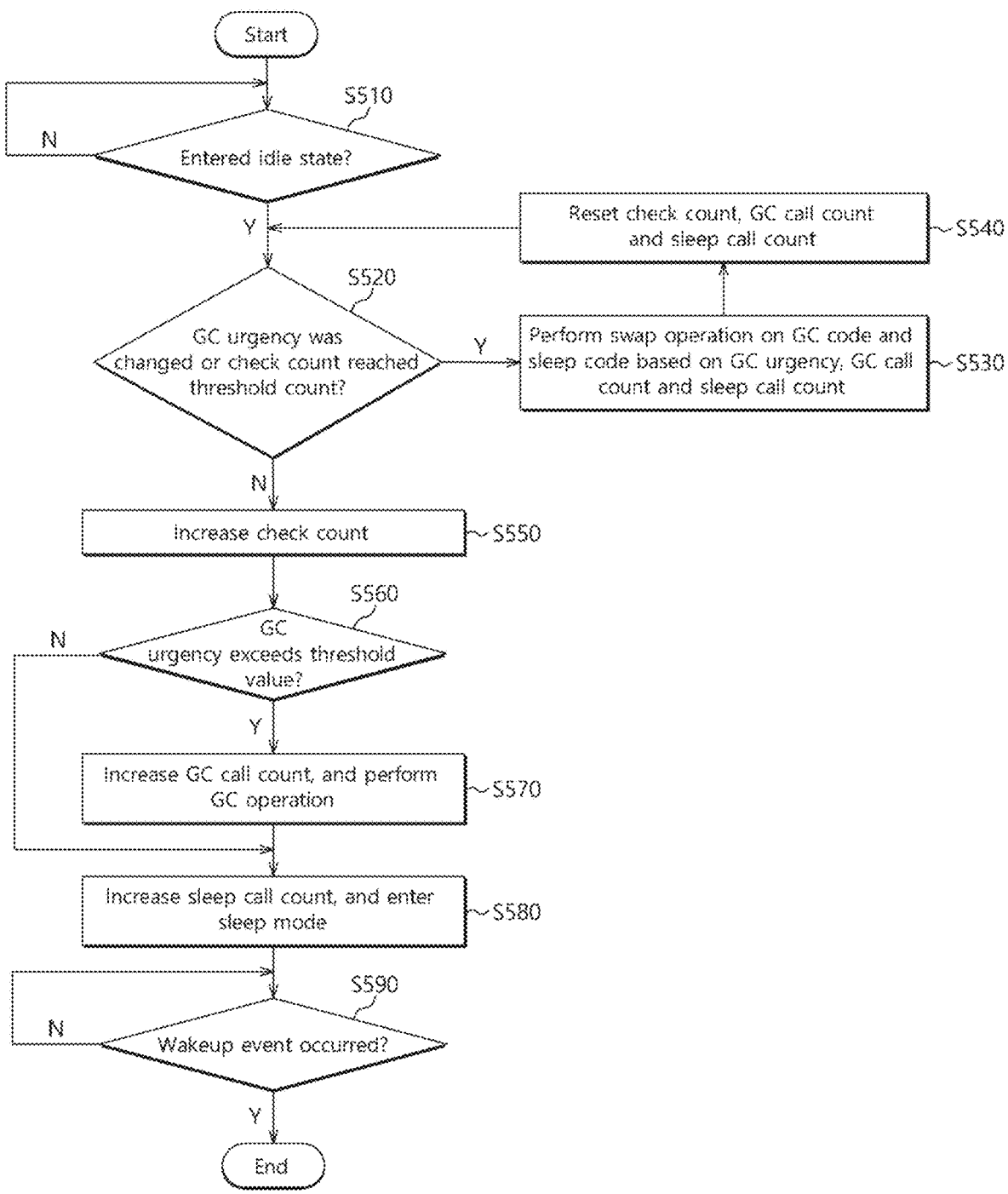
FIG. 7 is a flowchart illustrating a method in which the control unit of FIG. 1 performs a swap operation on the GC code and the sleep code.

FIG. 7 is a flowchart illustrating the method in which the control unit of FIG. 1 performs a swap operation on the GC code and the slip code. The procedure illustrated in FIG. 7 may further include managing a check count, compared to the procedure illustrated in FIG. 6. As described later, the control unit 111 may manage the check count in order to periodically check whether a swap operation is required even though the GC urgency is not changed.

In the procedure illustrated in FIG. 7, steps S510, S530 and S560 to S590 may be substantially the same as steps S410, S430 and S450 to S480 of FIG. 6. Therefore, the following description will be focused on differences from the procedure of FIG. 6.

Referring to FIG. 7, the control unit 111 may determine whether the control unit 111 has entered an idle state, at step S510. When it is determined that the control unit 111 did not enter the idle state ("N" at step S510), step S510 may be repeated. When it is determined that the control unit 111 has entered the idle state ("Y" at step S510), the procedure may proceed to step S520.

At step S520, the control unit 111 may determine whether the GC urgency was changed or the check count reached a threshold count. When the GC urgency was changed or the check count reached the threshold count ("Y" at step S520), the procedure may proceed to step S530.

At step S530, the control unit 111 may selectively perform a swap operation on the GC code and the sleep code, based on the GC urgency, the GC call count and the sleep call count.

At step S540, the control unit 111 may reset the check count, the GC call count and the sleep call count to a value of "0". The procedure may return to step S520.

When it is determined that the GC urgency was not changed and the check count did not reach the threshold count ("N" at step S520), the procedure may proceed to step S550.

At step S550, the control unit 111 may increase the check count.

At step S560, the control unit 111 may determine whether the GC urgency exceeded the predetermined threshold value. When the GC urgency does not exceed the threshold value ("N" at step S560), the procedure may proceed to step S580. When the GC urgency exceeds the threshold value ("Y" at step S560), the procedure may proceed to step S570.

At step S570, the control unit 111 may increase the GC call count, and call the GC code to perform a GC operation.

At step S580, the control unit 111 may increase the sleep call count, and call the sleep code to enter the sleep mode.

At step 590, the control unit 111 may determine whether a wakeup event occurred in the sleep mode. When no wakeup event occurred ("N" at step S590), the step S590 may be repeated. When a wakeup even occurred ("Y" at step S590), the procedure may be ended.

Figure 8:
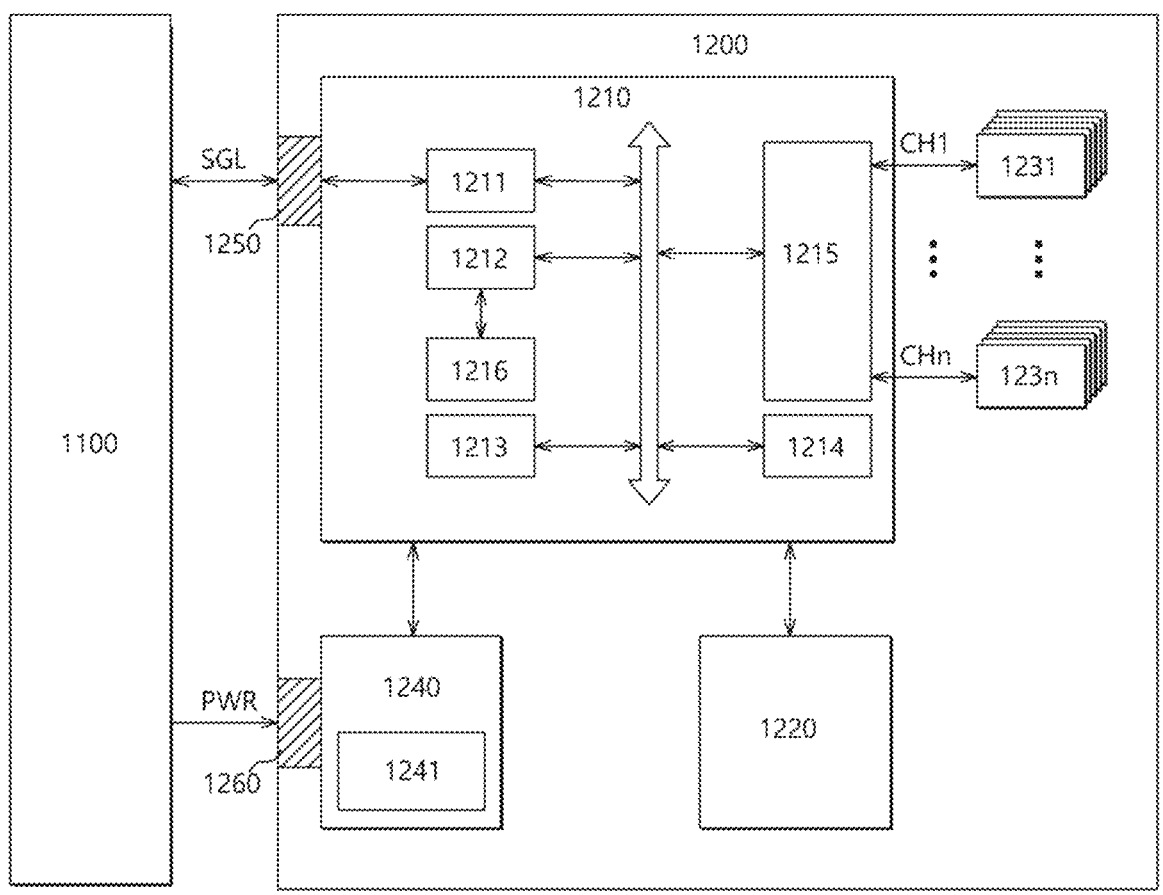
FIG. 8 is a diagram illustrating a data processing system including a solid state drive (SSD) in accordance with an embodiment.

FIG. 8 is a diagram illustrating a data processing system 1000 including a solid state drive (SSD) 1200 in accordance with an embodiment. Referring to FIG. 8, the data processing system 1000 may include a host device 1100 and the SSD 1200.

The SSD 1200 may include a controller 1210, a buffer memory device 1220, a plurality of nonvolatile memory devices 1231 to 123*n*, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, a memory interface unit 1215, and tightly coupled memory (TCM) 1216.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 and the TCM 1216 may be used as a working memory for driving such a firmware or software. The TCM 1216 may be accessed by the control unit 1212 more quickly than the random access memory 1213.

The control unit 1212 may be configured in the same manner as the control unit 111 shown in FIG. 1. The TCM 1216 may be configured in the same manner as the first memory MEM1 shown in FIG. 1. The random access memory 1213 may be configured in the same manner as the second memory MEM2 shown in FIG. 1.

The ECC unit 1214 may generate the parity data of data to be transmitted to at least one of the nonvolatile memory devices 1231 to 123*n*. The generated parity data may be stored together with the data in the nonvolatile memory devices 1231 to 123*n*. The ECC unit 1214 may detect an error of the data read from at least one of the nonvolatile memory devices 1231 to 123*n*, based on the parity data. If a detected error is within a correctable range, the ECC unit 1214 may correct the detected error.

The memory interface unit 1215 may provide control signals such as commands and addresses to at least one of the nonvolatile memory devices 1231 to 123*n*, according to control of the control unit 1212. Moreover, the memory interface unit 1215 may exchange data with at least one of the nonvolatile memory devices 1231 to 123*n*, according to control of the control unit 1212. For example, the memory interface unit 1215 may provide the data stored in the buffer memory device 1220, to at least one of the nonvolatile memory devices 1231 to 123*n*, or provide the data read from at least one of the nonvolatile memory devices 1231 to 123*n*, to the buffer memory device 1220.

The buffer memory device 1220 may temporarily store data to be stored in at least one of the nonvolatile memory devices 1231 to 123*n*. Further, the buffer memory device 1220 may temporarily store the data read from at least one of the nonvolatile memory devices 1231 to 123*n*. The data temporarily stored in the buffer memory device 1220 may be transmitted to the host device 1100 or at least one of the nonvolatile memory devices 1231 to 123*n* according to control of the controller 1210.

The nonvolatile memory devices 1231 to 123*n* may be used as storage media of the SSD 1200. The nonvolatile memory devices 1231 to 123*n* may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 9:
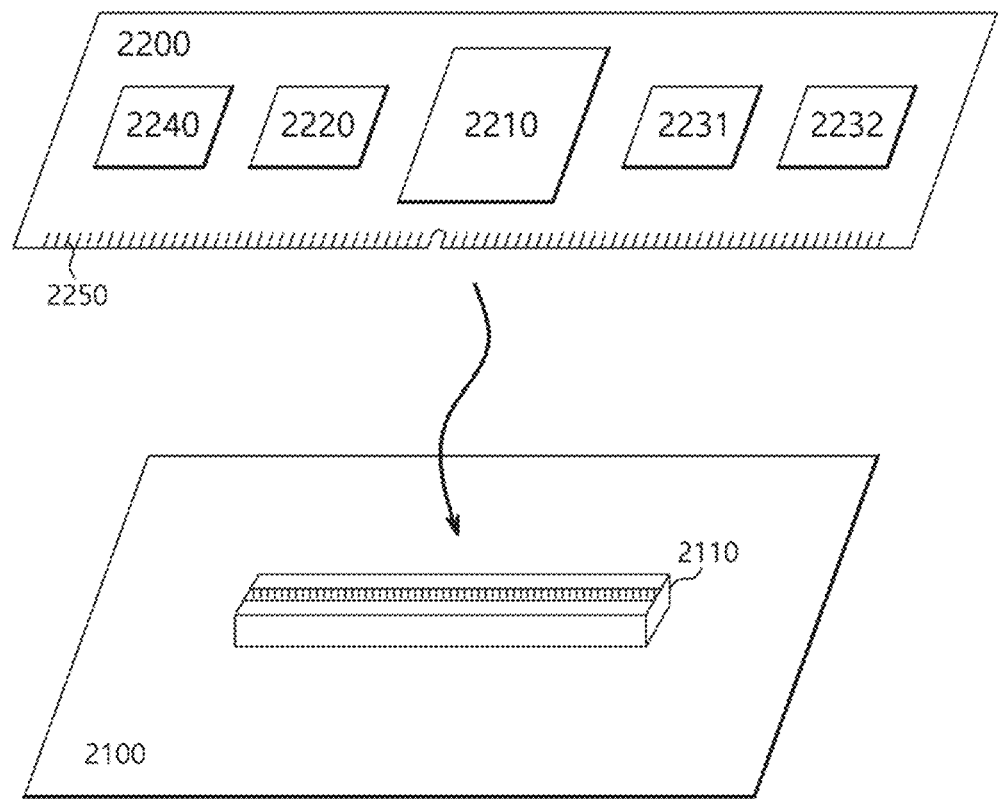
FIG. 9 is a diagram illustrating a data processing system including a memory system in accordance with an embodiment.

FIG. 9 is a diagram illustrating a data processing system 2000 including a memory system 2200 in accordance with an embodiment. Referring to FIG. 9, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 8.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth, and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 10:
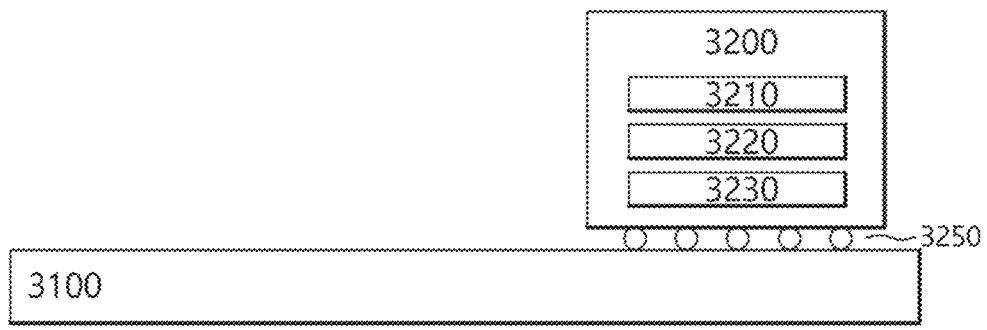
FIG. 10 is a diagram illustrating a data processing system including a memory system in accordance with an embodiment.

FIG. 10 is a diagram illustrating a data processing system 3000 including a memory system 3200 in accordance with an embodiment. Referring to FIG. 10, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 8.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 11:
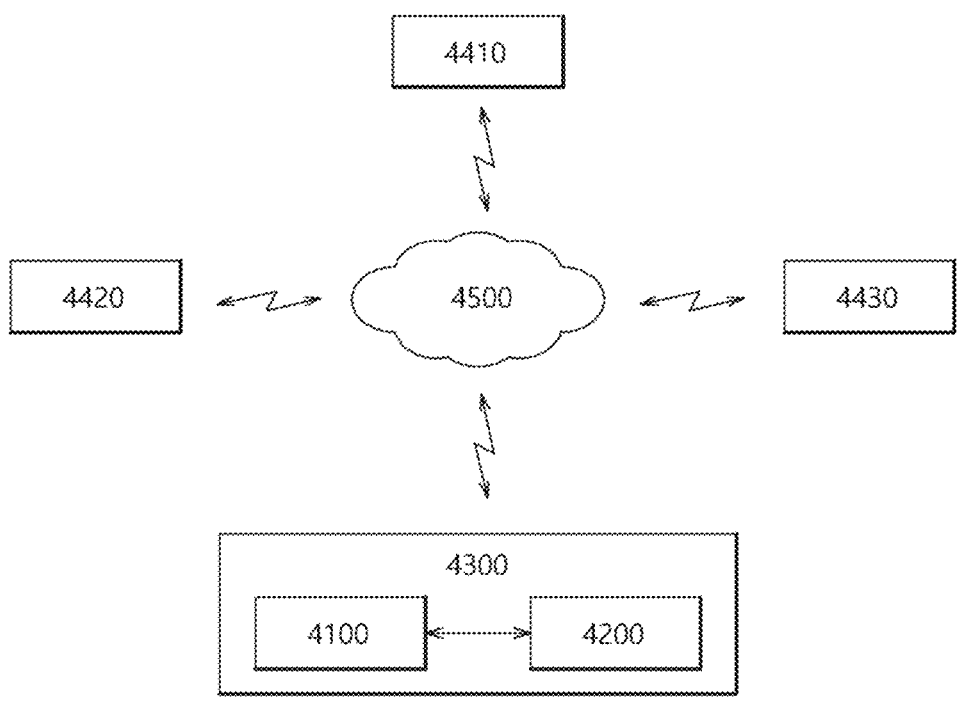
FIG. 11 is a diagram illustrating a network system including a memory system in accordance with an embodiment.

FIG. 11 is a diagram illustrating a network system 4000 including a memory system 4200 in accordance with an embodiment. Referring to FIG. 11, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 8, the memory system 2200 shown in FIG. 9 or the memory system 3200 shown in FIG. 10.

Figure 12:
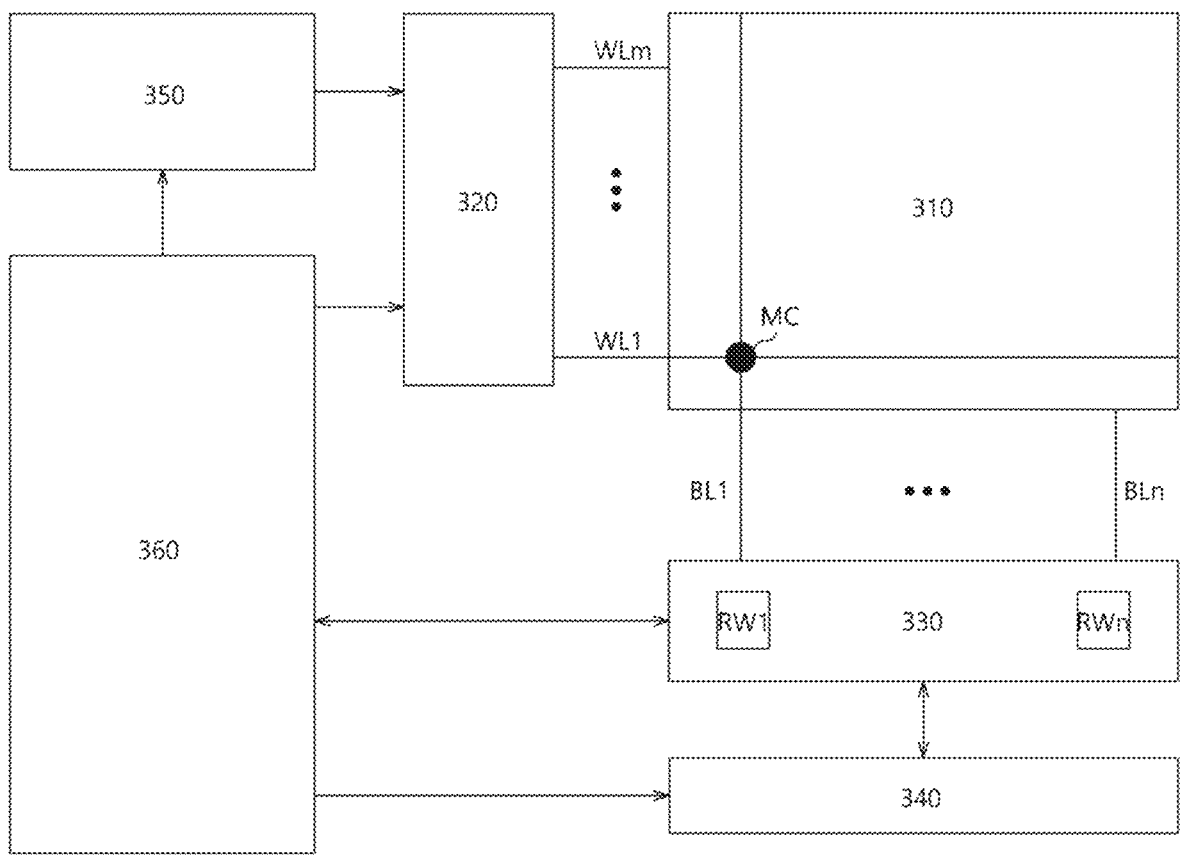
FIG. 12 is a block diagram illustrating a nonvolatile memory device included in a memory system in accordance with an embodiment.

FIG. 12 is a block diagram illustrating a nonvolatile memory device 300 included in a memory system in accordance with an embodiment. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the operating method of a data storage device described herein should not be limited based on the described embodiments.

What is claimed is:

1. A memory system comprising:
   a first memory comprising at least one first code region;
   a second memory comprising at least one second code region, and
   a controller configured to perform a first operation by executing a first code loaded to the first code region, and perform a second operation by executing a second code loaded to the second code region,
   wherein the controller performs a swap operation on the first code loaded to the first code region and the second code loaded to the second code region, based on a swap condition such that the second code is loaded to the first code region and the first code is loaded to the second code region, and such that a code with a higher call frequency of the first and second codes is stored in the faster one of the first and second memories.

2. The memory system of claim 1, further comprising a nonvolatile memory device configured to store the first and second codes,
wherein the controller loads the first and second codes stored in the nonvolatile memory device to the first and second code regions, respectively.

3. The memory system of claim 1, wherein the controller performs the swap operation based on the swap condition, when the first and second codes oppose each other.

* * * * *